(12) United States Patent
Deri

(10) Patent No.: US 10,411,416 B2
(45) Date of Patent: Sep. 10, 2019

(54) ELECTRONIC APPLIANCE WITH INTEGRAL REINFORCED USB

(71) Applicant: Tzvi Deri, Holon (IL)

(72) Inventor: Tzvi Deri, Holon (IL)

( * ) Notice: Subject to any disclaimer, the term of this patent is extended or adjusted under 35 U.S.C. 154(b) by 0 days.

(21) Appl. No.: 16/060,529

(22) PCT Filed: Dec. 5, 2016

(86) PCT No.: PCT/IL2016/051299
§ 371 (c)(1),
(2) Date: Jun. 8, 2018

(87) PCT Pub. No.: WO2017/098501
PCT Pub. Date: Jun. 15, 2017

(65) Prior Publication Data
US 2019/0157818 A1    May 23, 2019

(30) Foreign Application Priority Data
Dec. 9, 2015    (IL) .......................................... 242985

(51) Int. Cl.
| H02G 11/00 | (2006.01) |
| H01R 13/72 | (2006.01) |
| H02G 11/02 | (2006.01) |
| H01B 7/17 | (2006.01) |
| H02J 7/00 | (2006.01) |
| H04M 1/02 | (2006.01) |

(52) U.S. Cl.
CPC .............. *H01R 13/72* (2013.01); *H01B 7/17* (2013.01); *H02G 11/02* (2013.01); *H02J 7/0052* (2013.01); *H02J 2007/0062* (2013.01); *H04M 1/0202* (2013.01)

(58) Field of Classification Search
CPC .......... H01R 13/72; H01R 13/66; H01B 7/17; H01B 7/18; H01B 7/1805; H02G 11/02; H02G 11/00; H02G 15/00; H02G 15/007; H02G 15/103; H02G 15/184; H02J 7/0052; H02J 2007/0062; H02J 2007/006; H02J 7/0044; H02J 7/0042; H04M 1/0202; H04M 1/00; G06F 1/1628
USPC .......... 174/535, 50, 520, 68.1, 72 A; 248/49, 248/68.1; 320/114, 115; 361/679.01, 361/600, 601, 679.02
See application file for complete search history.

(56) References Cited

U.S. PATENT DOCUMENTS

| 6,259,031 B1 * | 7/2001 | Totland ................ H01B 7/1895 174/110 R |
| 8,469,303 B2 | 6/2013 | Feldstein et al. |
| 8,608,505 B2 * | 12/2013 | Mantay .................. H01R 31/06 439/505 |

(Continued)

FOREIGN PATENT DOCUMENTS

| CN | 203720416 | 7/2014 |
| CN | 204858216 | 12/2015 |

*Primary Examiner* — Angel R Estrada
(74) *Attorney, Agent, or Firm* — Robert G. Lev

(57) ABSTRACT

A cellular telephone appliance including: a cellular telephone housing; a USB receiving recess configured to receive a USB and a USB cable, which includes electrical wires and a security wire; and a USB cable release and retraction mechanism disposed in the cellular telephone housing. The USB cable includes a security wire configured to carry a tensile load on the USB cable upon pulling thereof.

12 Claims, 2 Drawing Sheets

(56) References Cited

U.S. PATENT DOCUMENTS

| | | | |
|---|---|---|---|
| 8,907,221 B1 * | 12/2014 | Mohanty | H01R 31/065 174/117 F |
| 10,199,142 B2 * | 2/2019 | Furukawa | H01B 1/026 |
| 10,223,882 B2 * | 3/2019 | Grant | G08B 13/1445 |
| 2014/0253038 A1 | 9/2014 | Posa | |
| 2015/0364875 A1 | 12/2015 | Ginsberg | |
| 2015/0366093 A1 | 12/2015 | Battista et al. | |

* cited by examiner

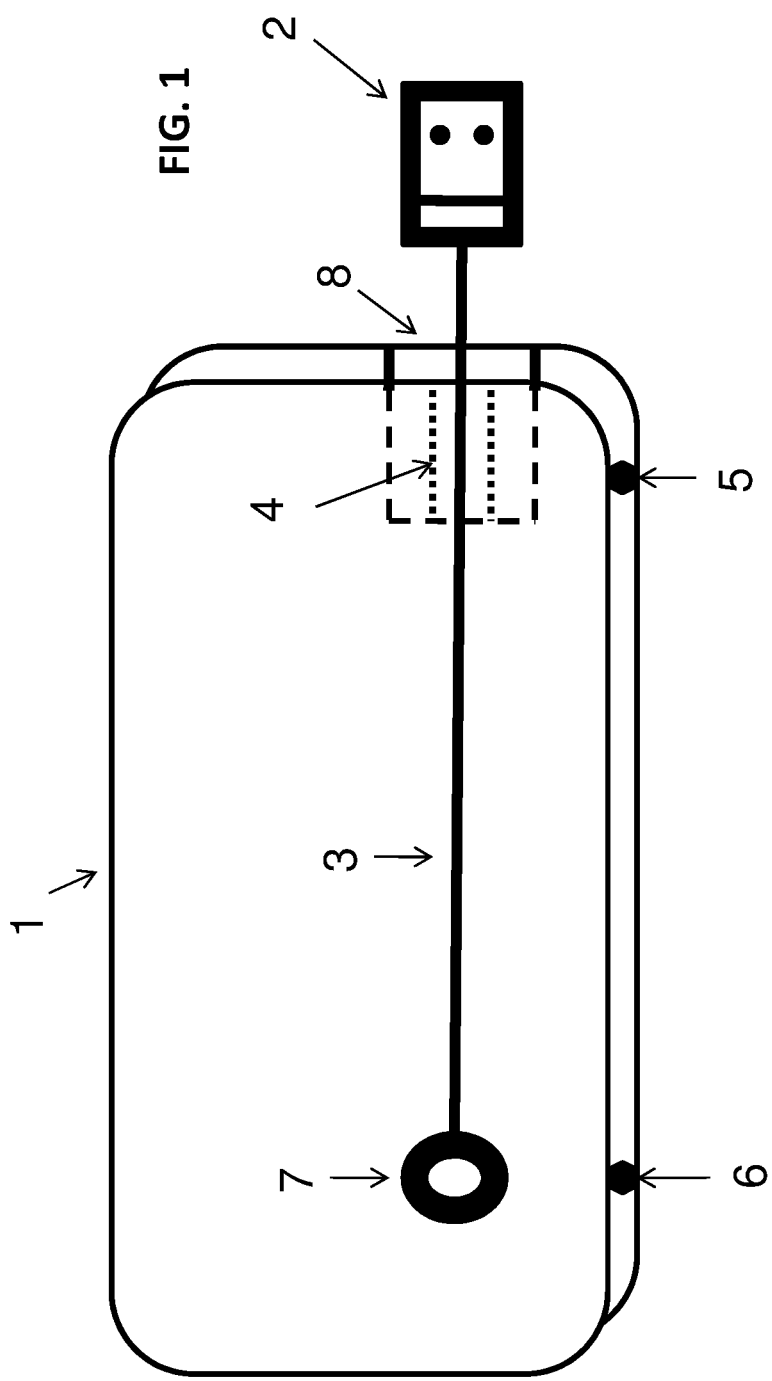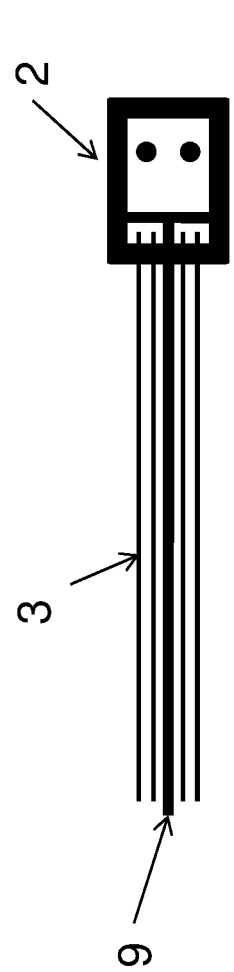

ELECTRONIC APPLIANCE WITH INTEGRAL REINFORCED USB

PRIORITY INFORMATION

The present application is a National Stage Entry of PCT/IL2016/051299, filed on Dec. 5, 2016, and claims priority from Israeli Patent Application No: 242985, filed on Dec. 9, 2015.

FIELD OF THE INVENTION

The present invention relates to charger cords/cables for electronic appliances.

BACKGROUND OF THE INVENTION

Appliances such as cellular telephones, note pads, laptop computers, digital cameras and the like are ubiquitous. These appliances usually utilize rechargeable batteries that require charging, often using a USB connector with an electrical cable that houses electrical wire(s), which may come under tensile load stress.

It is believed that the relevant prior art is represented by the following publications: CN 204809890U; CN 204668982U; CN 104701950A; CN 202587082U; AU 2012101165; US 2014/305,675; CN 203720416; and U.S. Pat. No. 8,075,335.

SUMMARY OF THE INVENTION

In accordance with embodiments of one aspect of the invention there is provided a cellular telephone appliance. The appliance includes: a cellular telephone housing; a USB receiving recess configured to receive a USB and a USB cable, which includes electrical wires and a security wire; and a USB cable release and retraction mechanism disposed in the cellular telephone housing. The USB cable includes a security wire configured to carry a tensile load on the USB cable upon pulling thereof.

In some embodiments, the security wire is tensioned at both ends thereof. In some embodiments, the security wire is disposed internally within the USB cable. In some embodiments, the security wire is disposed externally to the USB cable. In some embodiments, the security wire is made of fishing wire. In some embodiments, the USB cable release and retraction mechanism includes a spiral housing; at least one USB release spring; and an actuator.

In accordance with embodiments of another aspect of the invention there is provided a USB cable including a security wire configured to carry a tensile load thereon. In some embodiments, the security wire is tensioned at both ends thereof. In some embodiments, the security wire is disposed internally within the USB cable. In some embodiments, the security wire is disposed externally to the USB cable. In some embodiments, the security wire is made of fishing line.

The USB plug is be extendable from the appliance for the purpose of receiving electricity and charging, which will enable the public to save the complication and the need to carry with them additional charger or cables. The USB is also retractable back into (a housing of) the appliance.

Alternatively, an accessory that is adjacent to the USB plug and connected to the electronic or electric appliance that is removable or detachable.

The term "USB" will be used herein the specification and claims to include a "micro USB" and similar electronic connectors.

BRIEF DESCRIPTION OF THE DRAWINGS

FIG. 1 is a top view of a cellular telephone electrical appliance in accordance with embodiments of the present invention; and FIGS. 2 and 3 are top, partially internal, views of a USB cable in accordance with embodiments of the present invention.

DESCRIPTION OF PREFERRED EMBODIMENTS

Figure 3:
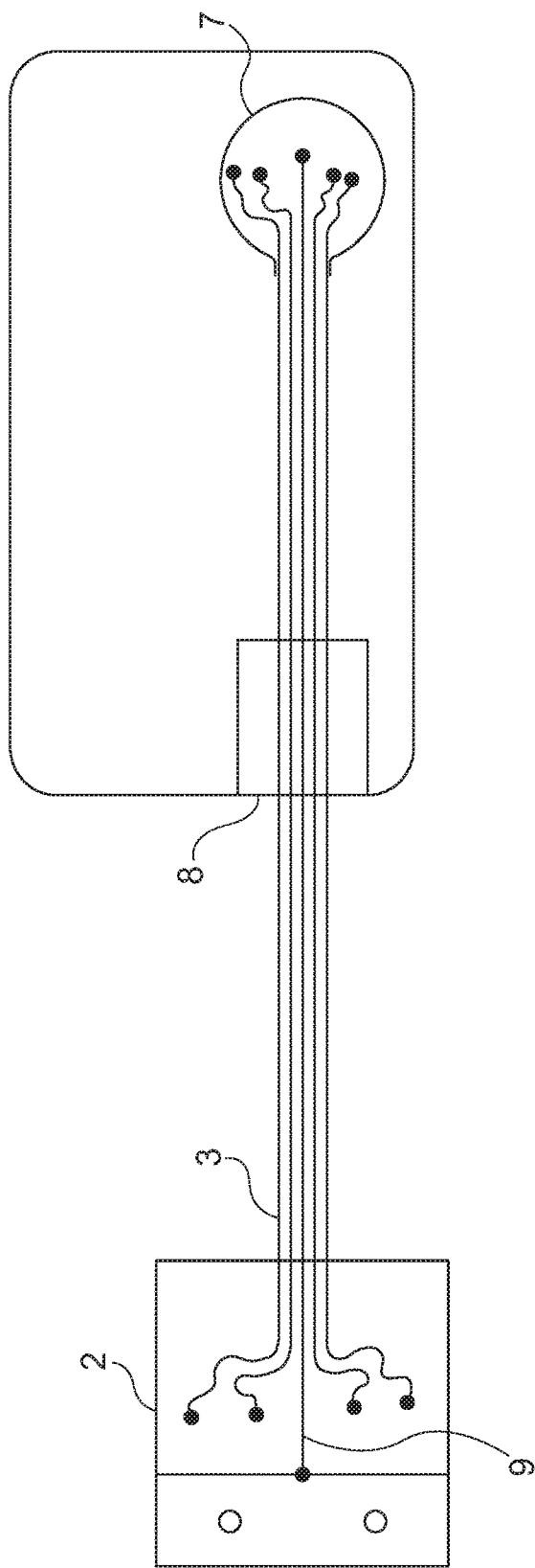

The present invention relates to a USB plug that is extendable and retractable from/to an electronic appliance for the purpose of receiving electricity and charging, which will enable the public to save the complication and the need to carry with them additional charger or cables, or to an accessory that is adjacent to the USB plug and connected to the electronic or electric appliance that is removable or detachable.

The term "USB" will be used herein the specification and claims to include a "micro USB" and similar electronic connectors. Embodiments are now described with reference to FIGS. 1-3.

The USB 2 is removable/released and detachable from the electrical or electric appliance housing 1 by respective pressing of a release button 5 and retraction button 6, with the aid of a resilient biasing member or spring 4 or by manual displacement, thereby enabling one's hand to grip and pull the USB 2 outward from the appliance, so that the USB will enter to the USB plug to receive electricity and be charged.

By pressing retraction button 6, the USB 2 will return to the USB housing recess 8 of the appliance and by additional slight manual pressing will be locked into the appliance or alternatively, into the housing of the appliance without manual aid.

An additional option is pushing and pulling back, that will cause the USB cable 3 to return to recess 8 of the housing 1 of the appliance and additional manual pressing that will lock it into the appliance or any other option that cause USB 2 to return to the opening/recess 8 of the housing of the appliance without manual aid.

The USB housing recess 8 can be in any location in the appliance or adjacent thereto. USB housing recess 8 that houses USB 2 has two springs 4 at both sides of the recess or one spring 4 at its center, or any other way that will cause, by pressing the outlet of the USB 2, a manual grip. The spring 4 or any other such biasing member(s) can be made of any type or material (iron, plastic, etc.) and any shape that could enable it to initially release/exit, likewise could be located at any location in the appliance, that will cause initial exiting and thereafter pulling it manually from the USB plug and back to the housing of the appliance.

The electrical wire (cable 3) is connected from the appliance to the USB plug. Outlet and entrance of the electrical USB cable 3 together with the USB 2 can be located in any portion of the appliance and in any manner and way, to enable a smooth exiting and insertion of the USB cable 3 out from the housing 1 of the appliance and back to the housing. The storage of cable 3 could be in a spiral (in spiral housing 7) or any other configuration, type or material etc.

The electric wire (cable 3) can be of any configuration, for example: circular, triangular, square, rectangular, flat and so on, and can be of any type of material that would cause it to initially exit and thereafter be manually pulled toward the USB socket and back to the housing in the appliance.

The electric cable 3 includes a security wire 9 (i.e. a reinforcement wire, cable or line, e.g. a fishing line). Security wire 9 is connected at both ends of the cable so as to be configured to carry the load of any tension on USB cable 2 and electric wires 3, and may be shorter than the electric wires (i.e. whereby the electric wires are not or insignificantly tensioned upon a tensile load—see FIG. 3 illustrating electric wires 3 having surpentine end portions demonstrating the lack of tension thereon). Security wire 9 can be internal to USB cable 2 or external thereto. Furthermore, security wire 9 can be made of any flexible and strong material, that can be used to secure/protect the USB's electric wires 3. Thus, security wire 9 extends the life expectancy of the USB's electric wires 3, for example so they will not tear and will not become disconnected despite repeated pulling because the pulling load will be on the security wire. At the same time both the electric cable and the security wire will be pulled together.

Buttons 5 and 6 can be located anywhere, and be of any appropriate type, shape, material and size in order to enable extraction of USB 2 from appliance housing 1, to allow extension from and retraction back into USB recess 8.

Advantages of the Invention

Carrying a charger is not required.
There is no need of for compatibility to different types and sizes of chargers.
The charging is guaranteed, by the security wire in the electric cable.
It is convenient and available for charging and use everywhere.
It is compatible with a micro-USB or the like via a connector (and the term "USB" herein the specification and the claims should be understood to include "micro-USB" and similar electronic connectors).
The invention is compatible with: (a) mobile and land-line phones; (b) all types of portable electronics: (c) all types of tablets; electric games and toys, and so on.

COMPONENT REFERENCE NUMBERING

Appliance housing 1
USB 2
Electric wires (USB cable) 3
Springs 4
USB release button 5
USB retraction button 6
Spiral housing 7
USB housing recess 8
Security wire 9

The invention claimed is:

1. An electronic or electric appliance having a USB cable or a micro USB cable, the cable being configured to charge the appliance, the appliance comprising:
   (a) A USB cable comprising electrical wires and at least one security wire;
   (b) a housing;
   (c) a USB recess in the housing or a USB recess in a device adjacent to the housing, the recess configured to receive the USB; and
   (d) a USB cable release and retraction mechanism disposed in said appliance housing, or disposed in a device adjacent to the housing wherein the security wire is configured to carry a tensile load on the USB cable upon pulling thereof by a user or by the release and retraction mechanism; and wherein the security wire is attached and connected at both ends, and the security wire is shorter than the electrical wires, the tensile load on the USB cable being carried only by the security wire.

2. The appliance of claim 1, wherein said security wire is disposed internally within said USB cable.

3. The appliance of claim 1, wherein said security wire is disposed externally to said USB cable.

4. The appliance of claim 1, wherein said USB cable release and retraction mechanism comprises a spiral housing; at least one USB release spring; and an actuator.

5. The appliance according to claim 1, wherein the recess is in a device adjacent to the housing, said device being external to and attached to the housing.

6. The appliance according to claim 5, wherein said device comprises a cover for the appliance.

7. The appliance according to claim 1, wherein the recess is in a device adjacent to the housing and the recess is not included in the housing.

8. The appliance according to claim 1, wherein the release and retraction mechanism is located in the housing.

9. The appliance of claim 1, wherein the release and retraction mechanism is located in a structure adjacent to the housing.

10. A USB cable comprising electrical wires and at least one security wire configured to carry a tensile load on the USB cable upon pulling thereof by a user or by a release and retraction mechanism; wherein the security wire is attached and connected at both ends, and the security wire is shorter than the electrical wires, the tensile load on the USB cable being carried only by the security wire.

11. The cable of claim 10, wherein said security wire is disposed internally within said USB cable.

12. The cable of claim 10, wherein said security wire is disposed externally to said USB cable.

* * * * *